(12) United States Patent
Baldi et al.

(10) Patent No.: US 11,960,613 B2
(45) Date of Patent: Apr. 16, 2024

(54) SYSTEM, DEVICE AND METHOD FOR SECURELY TRANSFERRING INFORMATION FROM A HARDWARE TO A BLOCKCHAIN

(71) Applicant: ZERYNTH S.R.L., Pisa (IT)

(72) Inventors: Giacomo Baldi, Calci (IT); Gualtiero Fantoni, Riglione (IT); Daniele Mazzei, Pisa (IT); Gabriele Montelisciani, San Giuliano Terme (IT)

(73) Assignee: ZERYNTH S.P.A., Pisa (IT)

( * ) Notice: Subject to any disclaimer, the term of this patent is extended or adjusted under 35 U.S.C. 154(b) by 318 days.

(21) Appl. No.: 17/298,857

(22) PCT Filed: Dec. 13, 2019

(86) PCT No.: PCT/IB2019/060750
§ 371 (c)(1),
(2) Date: Jun. 1, 2021

(87) PCT Pub. No.: WO2020/121265
PCT Pub. Date: Jun. 18, 2020

(65) Prior Publication Data
US 2022/0035932 A1    Feb. 3, 2022

(30) Foreign Application Priority Data
Dec. 14, 2018    (IT) .................... 102018000011129

(51) Int. Cl.
*G06F 21/34*    (2013.01)
*G06F 21/60*    (2013.01)
(Continued)

(52) U.S. Cl.
CPC .......... *G06F 21/606* (2013.01); *G06F 21/602* (2013.01); *H04L 9/0897* (2013.01); *H04L 9/3247* (2013.01); *H04L 9/50* (2022.05)

(58) Field of Classification Search
CPC ... G06F 21/606; G06F 21/602; H04L 9/0897; H04L 9/3247
(Continued)

(56) References Cited

U.S. PATENT DOCUMENTS 10,523,443 B1 * 12/2019 Kleinman ................. H04L 9/30
10,764,039 B2 *  9/2020 Shpurov ............. H04L 63/0442
(Continued)

FOREIGN PATENT DOCUMENTS

EP    2953290 A1    12/2015
EP    3413507 A1    12/2018

OTHER PUBLICATIONS

Mumin Cebe; A Network Coding Based Information Spreading Approach for ermissioned Blockchain in IoT Settings; ACM:Nov. 2018; pp. 470-475.*
(Continued)

*Primary Examiner* — Monjur Rahim
(74) *Attorney, Agent, or Firm* — Amster, Rothstein & Ebenstein LLP

(57) ABSTRACT

A data communication system for transferring data from a hardware unit to a blockchain or other distributed ledger. The system includes a hardware interface to connect to the hardware unit, and a device having a microcontroller, a secure element connected to the microcontroller, first communication module, and a communication protocol for enabling the microcontroller to communicate with the hardware interface through the first communication module. The microcontroller is configured to: read data from the hardware unit through the hardware interface; generate a transaction corresponding to the data; securely generate a blockchain private key ($d_B$); digitally sign the transaction by a blockchain private key ($d_B$); deliver the signed transaction, and then delete the blockchain private key ($d_B$) from volatile
(Continued)

memory of the hardware unit. The microcontroller is adapted to generate a blockchain private key ($d_B$) from parameters contained in part from the device itself and in part from the hardware interface.

19 Claims, 13 Drawing Sheets

(51) Int. Cl.
    *G06F 21/64*     (2013.01)
    *H04L 9/08*     (2006.01)
    *H04L 9/32*     (2006.01)
    *H04L 9/00*     (2022.01)

(58) Field of Classification Search
    USPC .......................................................... 713/164
    See application file for complete search history.

(56) References Cited

U.S. PATENT DOCUMENTS

| | | | | |
|---|---|---|---|---|
| 11,170,092 | B1 * | 11/2021 | Liang | H04L 9/0637 |
| 2018/0034625 | A1 * | 2/2018 | Hunacek | G06F 21/445 |
| 2018/0101906 | A1 * | 4/2018 | McDonald | G06Q 20/204 |
| 2018/0268382 | A1 * | 9/2018 | Wasserman | G06Q 20/0655 |
| 2018/0314539 | A1 * | 11/2018 | Vyas | G06F 9/45558 |
| 2019/0058709 | A1 * | 2/2019 | Kempf | G06F 21/64 |
| 2019/0205898 | A1 * | 7/2019 | Greco | G06Q 20/389 |
| 2019/0266576 | A1 * | 8/2019 | McCauley | G06F 21/645 |
| 2019/0340586 | A1 * | 11/2019 | Sheng | G06Q 20/367 |
| 2020/0174990 | A1 * | 6/2020 | Pratkanis | H04L 9/3221 |
| 2020/0278959 | A1 * | 9/2020 | Ramgopal | G06Q 20/02 |
| 2021/0144130 | A1 * | 5/2021 | Brun | H04W 12/35 |
| 2022/0051314 | A1 * | 2/2022 | Enkhtaivan | H04L 9/3239 |

OTHER PUBLICATIONS

International Search Report & Written Opinion received for the International Application No. PCT/IB2019/060750, dated Mar. 12, 2020, 12 pages.

Ledger Documentation Hub, Release 2, Available online at https://buildmedia.readthedocs.org/media/pdf/ledger/stable/ledger.pdf, Aug. 1, 2017, 58 pages.

Antonopoulos, Mastering Bitcoin—Unlocking Digital Cryptocurrencies, O'Reilly Media, Dec. 2014, pp. 89-98.

* cited by examiner

SYSTEM, DEVICE AND METHOD FOR SECURELY TRANSFERRING INFORMATION FROM A HARDWARE TO A BLOCKCHAIN

CROSS REFERENCE TO RELATED APPLICATIONS

This application claims benefit under 35 U.S.C. § 371 to international application No. PCT/IB2019/060750 filed on Dec. 13, 2019, which claims priority to Italian application No. 02018000011129 filed Dec. 14, 2018, the contents of which are incorporated by reference in their entireties.

BACKGROUND OF THE INVENTION

The new frontier of cyber security attacks is rapidly shifting from single computers to companies, always finding new and more sophisticated ways for extorting money or disrupting businesses. This trend is demonstrated by the recent attacks to major companies worldwide in different fields like transportation, logistics, banking and even military facilities.

Companies very often have or are a part of supply chains wherein an integrated enterprise manages the entire logistic chain by sharing the information with its partners or the other components of the supply chain. Some of them have businesses that partially overlap and while they collaborate in a supply chain, they may be competitors in other markets or activities. Therefore, a possible cyber-attack to one of the companies of the supply chain can affect the supply chain but can also alter the competition outside the supply chain.

Warehouse goods are generally monitored by control systems based on sensors. Without an effective anti-tampering protection, a cyber-attacker can, for instance, tamper with said systems in order to decrease the stock of a component in the warehouse of a single supplier thus mimicking a close/incoming stock shortage. Thus, an immediate order (sometimes automatic orders are activated in case of stock shortages) to replenish the warehouse is generated, based on a wrong information. The cyber-attack to fake an imminent stock shortage can be launched when the raw material costs are higher, thus inducing extra costs and ultimately altering the fair competition within and outside the supply chain.

After the order is placed the cyber-attacker could even restore the correct value of the stock, thus virtually cancelling the trace of his/her tampering or at least making the detection of the tampering very difficult to be carried out.

Another typical cyber security attack scenario is when the cyber-attacker operates in the opposite direction by increasing the quantities of some or all the raw materials in the warehouse. Trusting on the warehouse automatic management system, no one detects the missing items and the production stops because one or more parts are out of stock. Penalties will then be charged to the supplier responsible for the out of stock items. In some cases, the supplier can be removed from the supply chain.

Cyber security attacks launched against enterprises which are part of a supply-chain of companies sharing sensitive information, can therefore cause unfair competition issues between the companies of the supply chain. A supplier A of a certain component within a supply chain SC1 can be a competitor of the supplier B in another supply chain SC2. Having access to sensitive information concerning the supplier B in supply chain SC1 (for example regarding machine failures, production rescheduling, etc.), the supplier A can decide to make an offer in supply chain SC2 knowing that supplier B is experiencing problems, thus gaining new market share in an unfair way.

The above sensitive information can regard certain type of goods that a company handles and deal with. In fact, certain goods have a value that varies during their lifetime: radioactive drugs decay according to a proper time function, perishables goods have to be maintained under certain temperature conditions, fragile goods must be kept under certain maximum acceleration stress (impacts). Therefore, the value of these goods changes according to the time of the transport, the temperature-time situation, the acceleration to which they are subjected, and other key parameters. Supply contracts can thus be signed envisaging different values and agreements according to a particular function depending on one or more monitored key parameters. It is apparent that the monitoring and the following transmission of such parameters (normally performed by control systems associated with a number of sensors) is a sensitive task that can be subjected to potentially disruptive cyber-attacks.

In other cyber security attack scenarios, the control parameters of some apparatus, managed by control systems associated with sensors, can be slightly altered and changed, day by day, while keeping the value reported on the apparatus control interface stable at the nominal level. This will bring the apparatus to work out of the correct working zone causing abnormal stress and premature failures and damages. It would be thus desirable to design and provide a method and a device for secure data communication, adapted to interface set of sensors and multiple industrial machines based on microcontrollers or on low-end microprocessors in a secure way, thus overcoming the aforementioned drawbacks.

BRIEF DESCRIPTION OF THE INVENTION

Microcontrollers are electronic devices integrated on a single chip. While their principle of operation is common to the microprocessors, microcontrollers are differentiated by the fact of carrying the memory elements and the interface devices required for the digital control of specific applications on board, mostly in embedded systems that include sensors and actuators for most varied purposes. Unfortunately, microcontrollers have a limited memory space and computational resources thus making complex the use of cryptographic primitives (e.g. https based on big integer arithmetic) for secure communications between them or with other machines, gateways, etc. Such lack of resources has limited also the adoption of other cryptography-based technologies as, for example, a blockchain or other distributed ledgers. Same drawbacks apply to low-end microprocessors.

The present disclosure is directed to methods and systems for acquiring data from a source (for instance a data network gateway or an industrial machine endowed with PLCs, Programmable Logic Controllers, or other types of controllers, microcontrollers, low-end microprocessors, or with a set of sensors) generate a transaction from the data, encrypt the transaction by means of hardware powered security chips and finally securely transfer the transaction to a blockchain using a device based on a microcontroller or a generic low computational power device. An example of transaction can be, for instance, related to data concerning a warehouse movement where an item x has been scanned and transferred from one location to another. Thus, the data acquired by the system of the present invention may refer to the event of the warehouse movement and the transaction that is generated may comprise the code of the item x, the time and date of the transfer of the item x, the initial and the final location of the item x. With the system according to the present disclosure this transaction is generated, encrypted and transferred to a blockchain (or other distributed ledger) in order to securely certify the event, it refers to (in the above example, the warehouse movement of the item x).

The device according to the present invention is capable of interfacing, without human intervention, single or multiple industrial machines or set of sensors with single or multiple blockchain or other DLT (Distributed Ledger Technology) implementations. Thus, in the present disclosure, the term "blockchain" is to be considered referring to any distributed ledger.

Preferably, the device according to the present invention is implemented as a dongle, a small piece of hardware adapted to connect to another device to provide it with additional functionality.

According to a preferred embodiment, the device of the present invention is a dongle provided with communication capability: thus, the dongle generates and certifies the transactions and also writes them into the blockchain. The hardware to which the dongle is connected does not need to have communication capability and it can be also a RFID reader or a beacon or other similar piece of hardware (active or passive) that can be read by the dongle in order to acquire the information, e.g. identity, timestamp, or any other metadata stored in said hardware, metadata that the dongle will use to write a message in the blockchain.

According to another preferred embodiment, the device of the present invention is a dongle with no communication capability: thus, the dongle only generates and certifies the transactions, while the hardware to which the dongle is connected is responsible to write the certified transactions into the blockchain.

According to a further embodiment, the device of the present invention is a modular dongle adapted to be added or embedded as, for instance, a hardware part in the electronic control module of an industrial apparatus.

According to another embodiment, the device of the present invention is a multi-input dongle adapted to receive and process input data from a plurality of sources. Further features and advantages of the present invention will be apparent in the following description of a non-limitative embodiment with reference to the figures in the accompanying drawings, which are diagrammatic and show functional blocks which are adapted to be implemented with a hardware structure according to different circuitry solutions in practice or with a software structure, for example coded into firmware and executed by a suitable hardware. In detail:

DETAILED DESCRIPTION OF THE INVENTION

The present disclosure is directed to methods, systems and devices for acquiring data from a source (for instance a data network gateway or an industrial machine endowed with PLCs—Programmable Logic Controllers —, or other types of controllers, microcontrollers, low-end microprocessors, or with a set of sensors) extract information from the data, encrypt the information by means of hardware powered security chips, generating a transaction corresponding to the information extracted from the data and finally securely transfer the information to a blockchain—or any other generic distributed ledger—using a device based on a microcontroller or a generic low computational power device.

The device according to the present invention is capable of interfacing single or multiple industrial machines or set of sensors with single or multiple blockchain or other DLT (Distributed Ledger Technology) implementations, without human intervention. Preferably, the device according to the present invention is implemented as a dongle, a small piece of hardware adapted to connect to another device or apparatus to provide it with additional functionality.

Figure 8:
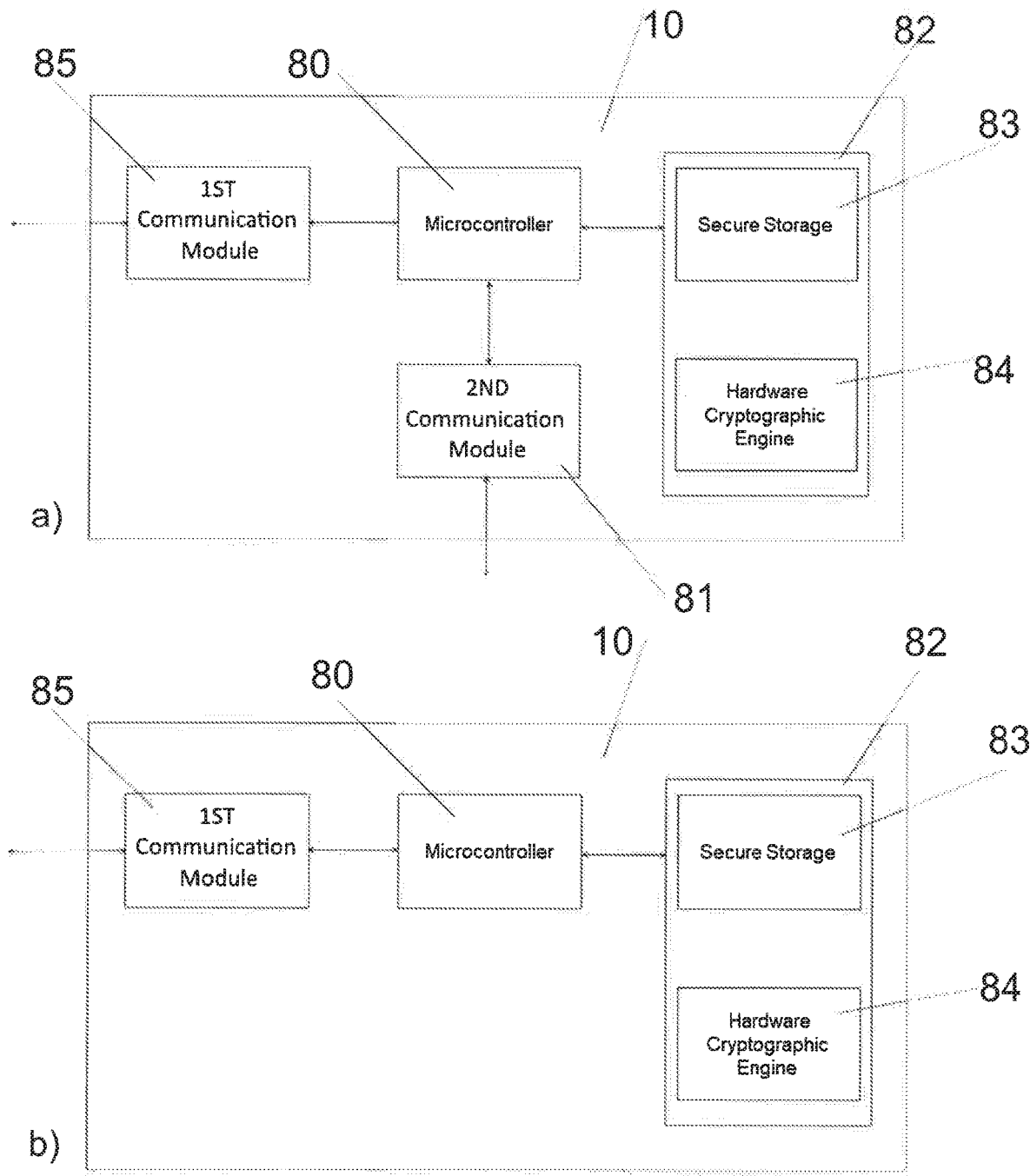
FIG. 8 shows a preferred embodiment of the device according to the present disclosure in the cases where a) the device of the invention is provided with connecting means to write a transaction into a remote distributed ledger, b) the device of the invention is not provided with connecting means to write a transaction into a remote distributed ledger.

With reference to FIG. 8, a preferred embodiment of the device 10 according to the invention comprises a PLC, a microcontroller, a low-end microprocessor or a generic low computational power device 80, a first communication module 85 and a secure element 82 comprising secure storage means 83 and a hardware cryptographic engine 84. A secure element 82 is a chip which can store sensitive data and run secure applications for performing tasks such as, e.g. a payment. The secure element 82 acts as a vault, protecting what's inside the secure element 82 (both applications and data) from possible malware attacks that may happen, e.g., in the host system. An example of secure element 82 is the commercially available device ATECC608A by the company Microchip™.

The first communication module 85 is adapted to communicate with external digital systems, e.g. a machine interface 11 adapted to connect the device 10 with another external hardware unit, said machine interface 11 being hereinafter referred to as hardware interface 11. The hardware interface 11 is provided with a computational unit that can be implemented on a microcontroller. A second device 10 according to this disclosure can also be configured to operate as a hardware interface 11 and to communicate with the first device 10. In other embodiments the hardware interface 11 may comprise a programmable machine interface that can be modified to interact with the device 10 of the invention and its protocol. In further embodiments the hardware interface 11 may be embedded into the external hardware unit to which the device 10 needs to connect.

Preferably, the features of a hardware interface 11 are: capability to compute basic cryptographic primitives (such as, e.g., Elliptic curve cryptography, RSA cryptography, SHA functions); communication capability (e.g. Ethernet, Wi-Fi, Bluetooth, serial, etc.); capability to store data in memory means, preferably in secure memory means.

In the following part of this disclosure the terms cryptographic keys and random strings are used. These terms are both defined as random sequences of bits generated on a FIPS-140 compliant hardware module by a random bit generator with features approved by security standards such as FIPS-186-3. The difference between the two terms is functional: a cryptographic key is a random string used as a key in a cryptographic algorithm whereas a random string is not. Cryptographic keys are used to encrypt messages by means of appropriate cryptographic algorithms; in such context a message is defined as a sequence of bits formatted according to a convention common to the sender and the receiver of the message. Encrypted messages, being sequences of bits, can be transmitted by means of different technologies over different mediums (electromagnetic fields, rays of light, electrical currents, etc.); abstracting away from the particular technology, a message is said to be transmitted over a channel; generally, sequences of bits transmitted over a channel can be intercepted by any actor (any attacker) having access to such channel, thus allowing the actor to read the transmitted information. Therefore, if the information to be transmitted is required to be known only by the sender and the intended receiver, such information is usually suitably modified by a cryptographic algorithm (i.e. encrypted) in such a way that even if the encrypted information being transmitted is read by an attacker, the attacker can't reverse the cryptographic algorithm in a computationally feasible manner to obtain the unencrypted information Regarding the interaction with a blockchain or with a generic remote distributed ledger, a crucial issue regarding the device 10 according to the present invention is the storage of the private key that controls the blockchain address. It is a crucial issue because, if the storage of a key is not secure, then it exposes the key itself to advanced hacking techniques like thermography or direct hardware access. Today there are two kind of hardware specialized in storing blockchain keys and adapted to generate transactions: hardware wallets and hardware security modules or HSMs.

Regarding hardware wallets, the generation of a transaction from these devices is consequent to a human decision, therefore the key can be stored in an encrypted form that can be decrypted by asking via a human interface for a pin, a password, a biometric or more generally a piece of data from which the original private key can be reconstructed and used to sign a transaction. While this approach is meaningful for hardware wallets designed for humans, it is not feasible for the device according to the present invention the purpose of which is to allow other connected hardware to participate in a blockchain platform.

Regarding HSMs, they can generate and store private keys and signing data with said private keys, adopting different levels of safeguards against tampering. However, their level of sophistication comes at a relatively high price and they are normally designed as a general-purpose secure storage for a huge number of private keys for banking, payment and certification applications.

Instead of storing the private key somewhere, the approach used in the blockchain device according to the present invention makes it possible to generate the private key from parameters contained part in the device itself and part in other hardware units, namely a hardware interface 11, interacting with the device 10 over a communication channel. In such a way, any physical tampering with the device 10 will not disclose the private key since the private key is not entirely stored either in the device or in the connected hardware.

In further detail, the blockchain private key is built from two pieces of information coming from different sources. The first piece of information is initially generated and saved securely within the secure element 82 at the initialization of the device. This first piece of information is not known to the user who performs the initialization of the device, it is known to the device only and it never leaves the device itself.

The second piece of information is provided by the single hardware interface 11 or by the multiple hardware interfaces 11 to which the device 10 is connected through the first communication module 85.

The device microcontroller, low-end microprocessor or generic low computational power device 80 is adapted to carry out an algorithm to generate (or reconstruct) the blockchain private key, digitally sign the transaction, deliver the transaction and then delete the blockchain private key from memory.

Figure 1:
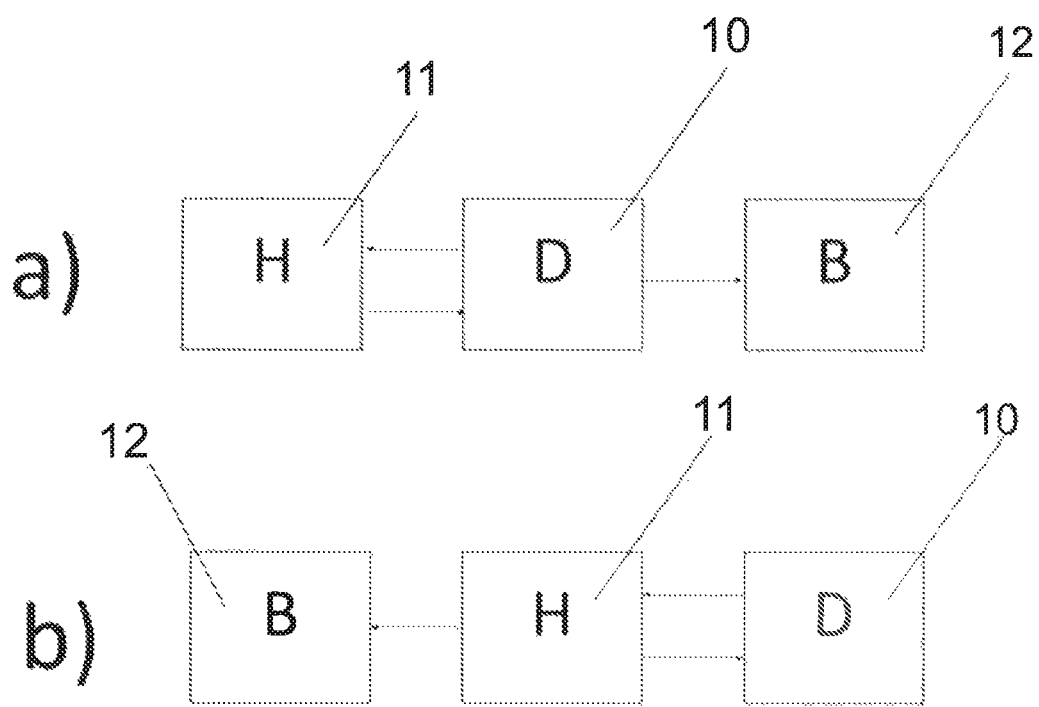
FIG. 1 shows a schematic block diagram of preferred embodiments of the system according to the present disclosure in the cases where a) the device of the invention is provided with connecting means to write a transaction into a remote distributed ledger, b) the device of the invention is not provided with connecting means to write a transaction into a remote distributed ledger.

The blockchain device according to the present disclosure is adapted to interface multiple industrial machines or set of sensors with multiple blockchain and other DLT (Distributed Ledger Technology) implementations, without human intervention. With reference to enclosed FIG. 1 a) and FIG. 8 a), the device 10 according to the present disclosure can be provided with a second communication module 81 for connecting to a remote server where a blockchain or a generic distributed ledger node is hosted and for writing the transaction into a blockchain. FIG. 1 a) shows a device 10 according to the invention that is therefore adapted to generate and certify transactions and writing the transactions into the blockchain.

In this embodiment the device may be adapted to read from a RFID or from a beacon or from a similar—active or passive—piece of hardware. As a non-limiting example, the device 10 will be associated to an RFID reader. Every time that the reader reads an RFID (e.g. a warehouse movement regarding an item x that was sold at a certain time y), then the collected data—e.g. code and identity of the item, timestamp of the movement, operator ID and other meta-data—will be sent by the RFID reader to the device 10 that will format the received data into a transaction, sign the transaction and send it to the blockchain, thus securely certifying that the item x was sold at the time y.

FIG. 1 b) shows a device 10 according to the present disclosure with no communication capability, while the connected hardware interface 11 is provided with means of communication. In this embodiment, the device 10 only signs the transactions, while the hardware is responsible to write the signed transactions into the blockchain.

The communication protocol between the hardware interface 11 and the device 10 according to the present disclosure may take place—through the first communication module 85—over a wired or wireless channel and is agnostic with respect to the platform on which it is performed and therefore compatible with existing standards regarding both cryptography and protocol format; one possible and convenient implementation of the protocol is based on the Hayes command set, a popular command set, used for decades in telecommunications and networking, also known as AT command set (with AT short for attention). The AT command set has been introduced and used extensively with modems and modulator/demodulator devices, adapted to read digital information, modulate it over analog channels, and return digital information demodulated from the analog format. During the years the term "modem" has broadened its original meaning, generally indicating communication devices used to link computers to other computers or networks. In this broader sense the AT commands set nicely fits the device 10 according to the present disclosure that can be seen as a sort of "blockchain modem".

The Hayes command set is characterized by basic AT commands, command formats and result codes. It has been extended for custom solutions, the most popular of which is the one adopted for Global System for Mobile Communications (GSM) modems. Hence, the device 10 according to the invention can make use of a blockchain custom set of AT commands to standardize the blockchain functionalities exposed to the connected hardware.

A preferred example of a set of parameters, their generation and handling by the system according to the present disclosure is summarized in the following table:

| Parameter | Type | Shared with | Saved in | Transmitted | Generated in step |
|---|---|---|---|---|---|
| Dongle Private Key ($d_D$) | Asymmetric Key (e.g. secp256r1) | No one | Hardware Secure Storage Dongle | Never | Priming |
| Dongle Public key ($Q_D$) | Asymmetric Key (e.g. secp256r1) | Public | Generated as needed from $d_D$ | Priming Phase | Priming |
| Dongle Unique Identifier ($UID_D$) | String | No one | Hardware Secure Storage Dongle | Never | Priming |
| Blockchain Public Address ($Q_B$) | String | Public | Hardware Secure Storage Dongle | Never | First Transaction |
| HW Interface Private Key ($d_H$) | Asymmetric Key (e.g. secp256r1) | No one | Hardware (Secure or Not) | Never | Priming |
| HW Interface Public Key ($Q_H$) | Asymmetric Key (e.g. secp256r1) | Public | Generated as needed from $d_H$, stored in Dongle Secure Storage (optional) | Priming Phase | Priming |
| HW Interface Unique Identifier ($UID_H$) | String | No one | Hardware (Secure or Not) | Step 3 (encrypted) | Priming |

With reference to FIG. 8, preferably the secure element 82 (sometimes referred to as crypto chip or secure storage) of the device 10 according to the present disclosure is an integrated circuit with the following features:
  the ability to generate a truly random (opposed to a pseudo random) private key (dc in the above table);
  the ability to store data in a way that is physically very difficult to be accessed (i.e. safe from thermography or X-ray screening of the integrated circuit) with respect to standard non-volatile memories;
  the ability to execute cryptographic signature algorithm directly on the integrated circuit without exposing the private key plus the optional ability to have monotonically increasing non-volatile hardware counters.

Figure 2:
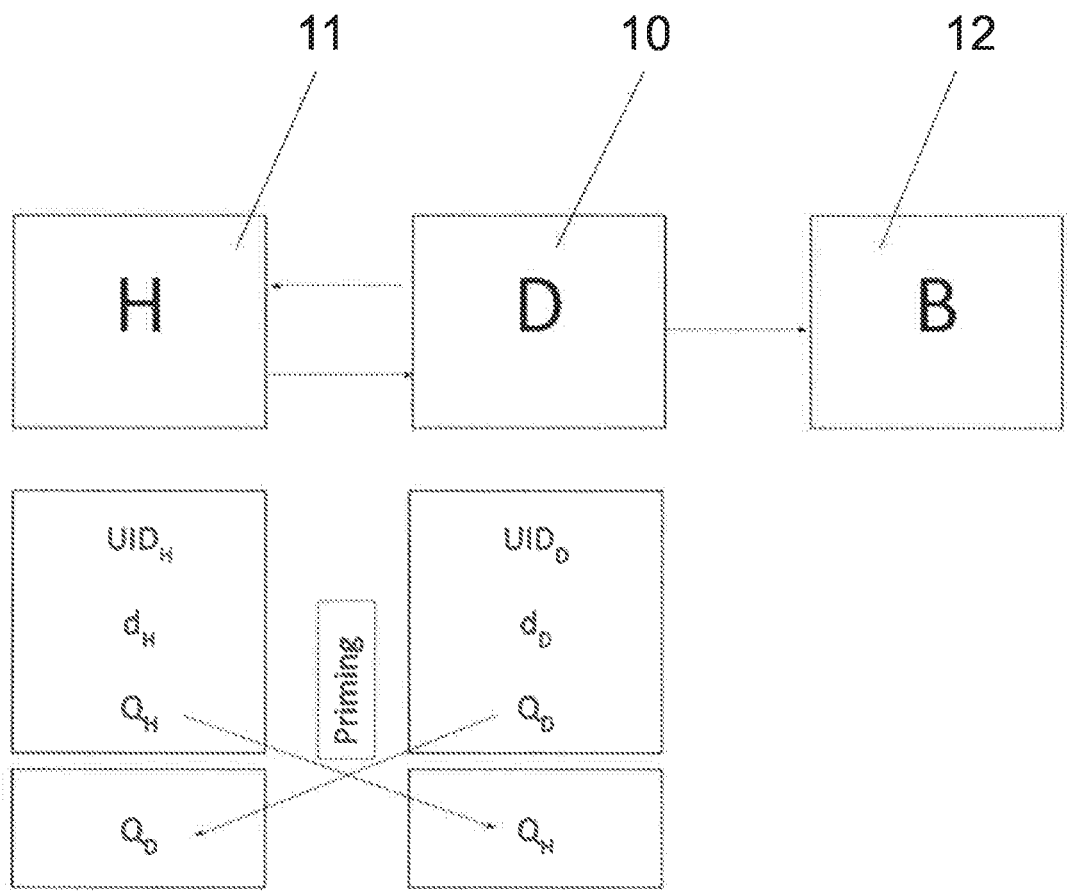
FIG. 2 shows a schematic block diagram of a preferred embodiment of the system according to the present disclosure wherein the data exchange during initial setup, "priming", phase is illustrated.
Figure 9:
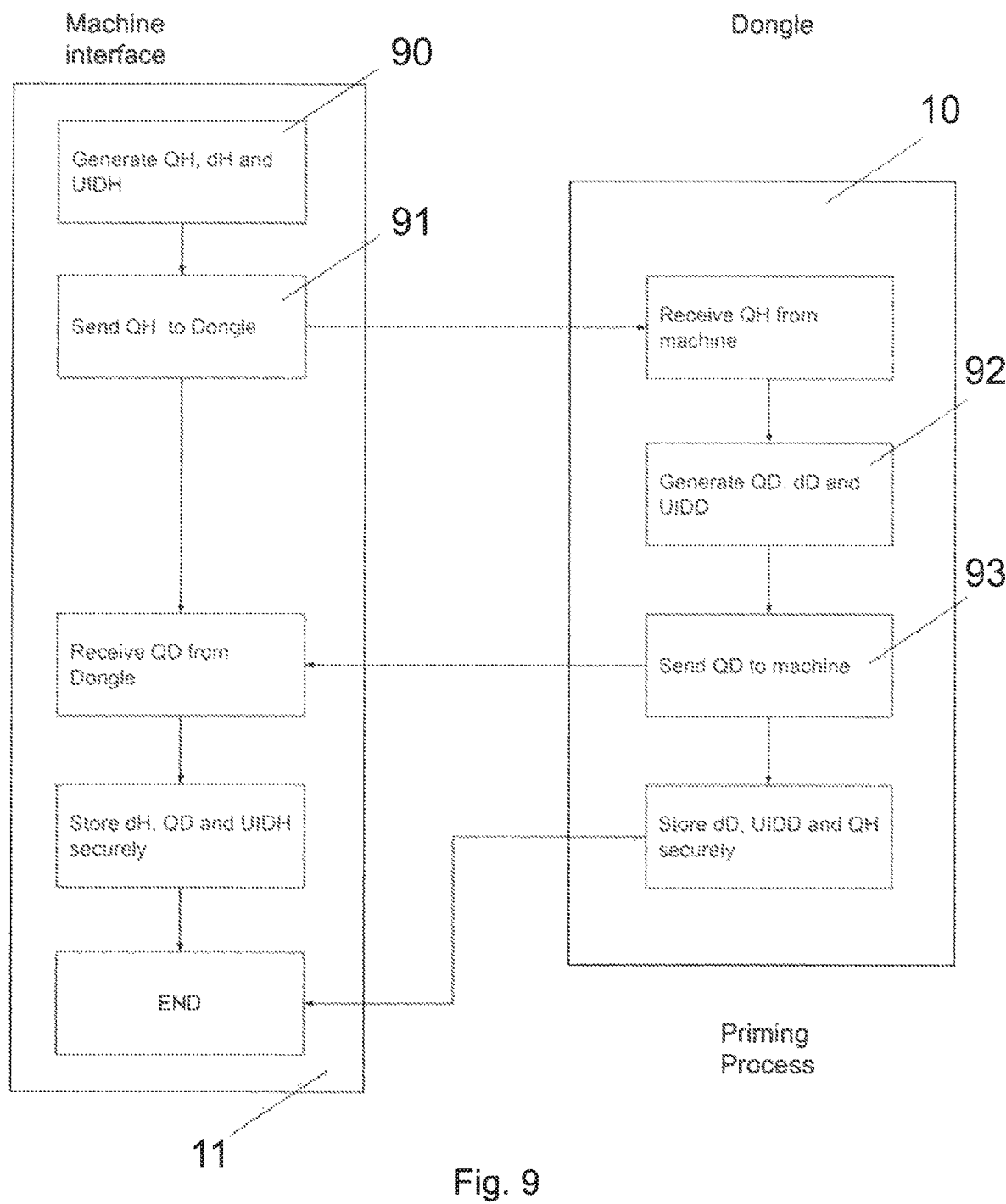
FIG. 9 shows an additional schematic block diagram of a preferred embodiment of the priming process within the system of the invention with the steps performed by the device of the invention and by the hardware interface highlighted.

With reference to enclosed FIG. 2 and FIG. 9, the device 10 according to the present disclosure (from now on preferably referred to as "dongle" according to one of the embodiments of the present disclosure) carries out an initial phase referred to from now on as priming phase—of initial setup where the dongle 10 generates 90 a set of parameters. These parameters are, for instance, $d_D$ (Dongle Private Key), $Q_D$ (Dongle Public key), $UID_D$ (Dongle Unique Identifier), $d_H$ (HWUnit Private Key), $Q_H$ (HWUnit Public Key) and $UID_H$ (HWUnit Unique Identifier). Said parameters can be generated by a cryptography certified random number generator that can be located within the microcontroller 80 or within the secure element 82. The initial priming phase starts with the generation, by the hardware interface 11 connected to the dongle 10, of the parameter $Q_H$—Public Key of the hardware interface 11 and proceeds with the transfer of the parameter $Q_H$ from the hardware interface 11 to the Dongle Secure Storage 83. Multiple public keys can also be transferred if more hardware interfaces are requested. Then the dongle 10 proceeds by generating 92 the parameters dD (the Dongle Private Key), $Q_D$ (the dongle public key), and $UID_D$ (the dongle 10 unique identifier), and then transferring 93 the parameter $Q_D$ to the hardware interface 11 and saving securely in the secure storage 83 the parameters $Q_H$, $d_D$ and $UID_D$.

Figure 3:
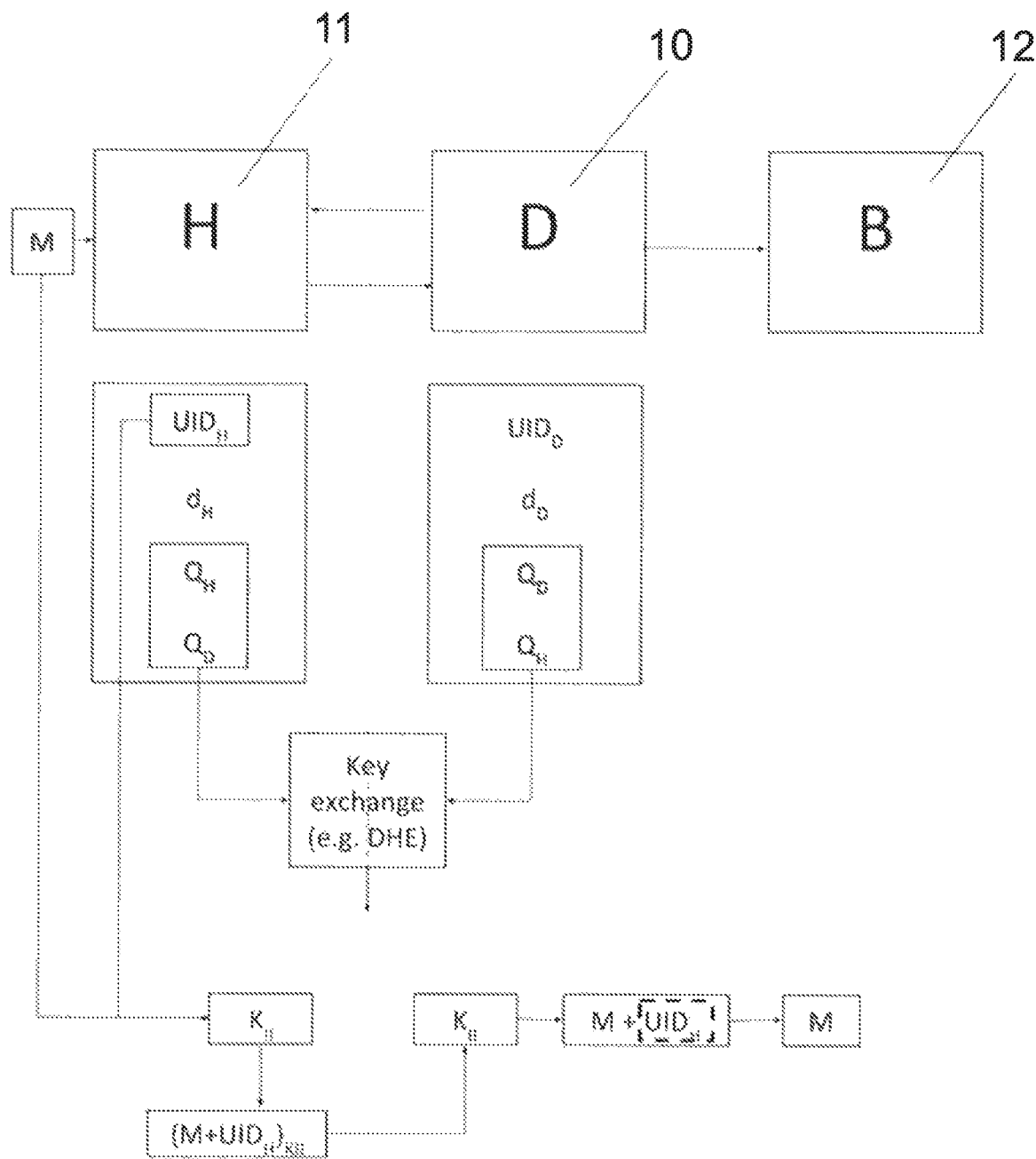
FIG. 3 shows a schematic block diagram of a preferred embodiment of the system according to the present disclosure wherein a secure key K is exchanged between the device of the invention and a connected hardware interface.
Figure 10:
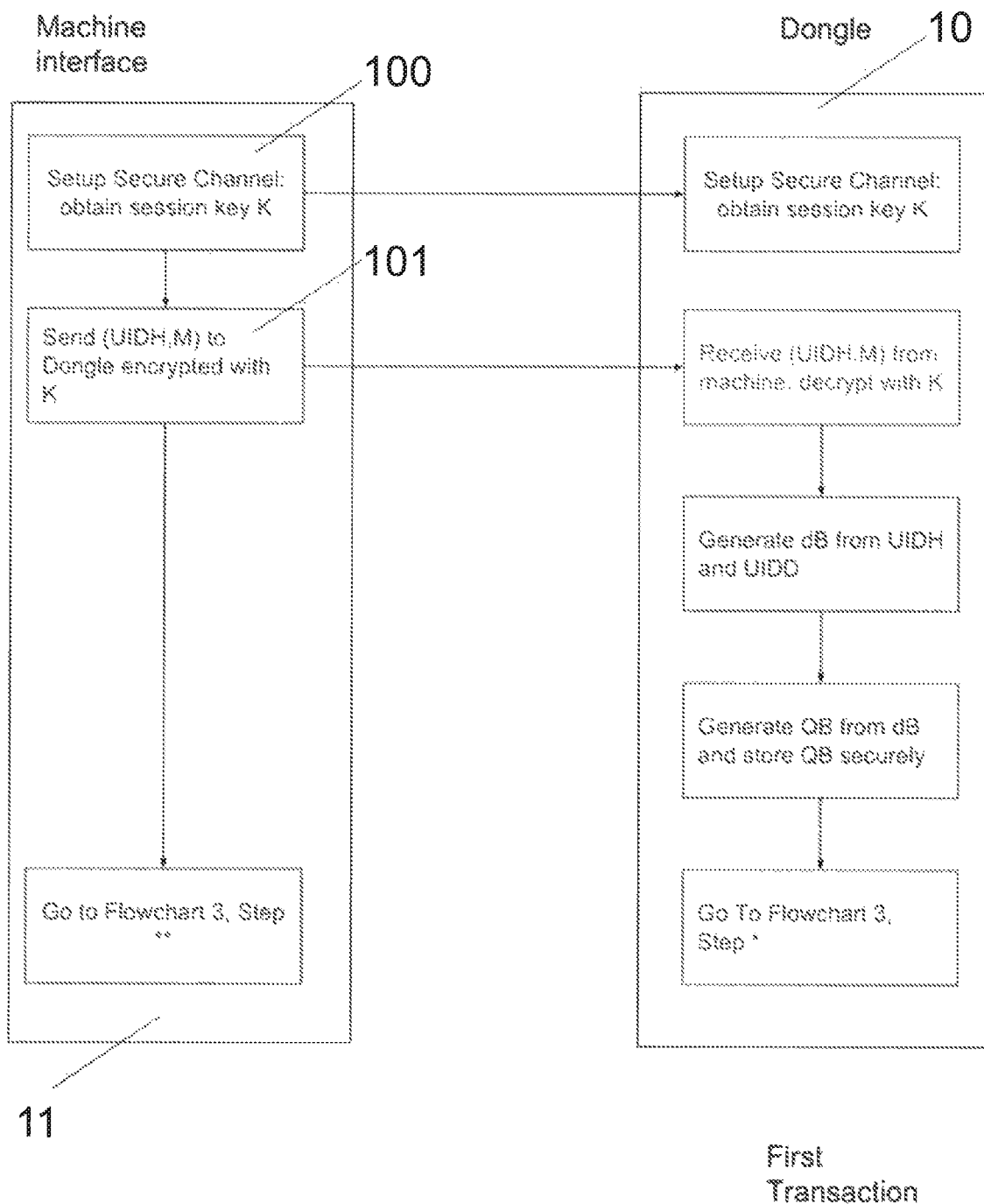
FIG. 10 shows an additional schematic block diagram of a preferred embodiment of a first transaction within the system of the invention with the steps performed by the device of the invention and by the hardware interface highlighted.

After the priming phase, an example of first transaction between dongle 10 and hardware interface 11 and generation of blockchain private key $d_B$ is depicted in FIG. 3 and in FIG. 10:

The hardware interface 11 and the dongle 10 cooperate in securely exchanging 100 a secret key K over an insecure channel by applying, for instance, the Diffie-Hellman key exchange algorithm (in one of its flavors DH, DHE, ECDH, ECDHE). The Diffie-Hellman algorithm requires 5 parameters: two pairs of private-public keys and the characteristics of domain over which the calculations are performed (generally elliptic curves or integer multiplicative groups). The keys $d_D$, $Q_D$, $d_H$ and $Q_H$ are used in this step as parameters of the Diffie-Hellman algorithm ($d_D$ and $d_H$ being the private keys, $Q_D$ and $Q_H$ the public keys; the domain is determined by the Diffie-Hellman flavor chosen) with $d_D$ and $d_H$ never leaving their respective secure storage, $d_H$ the secure storage of the hardware interface 11 and $d_D$ the secure storage 82 of the dongle 10.

The secret key K is used to encrypt any successive communication between hardware interface 11 and the dongle 10 over the insecure channel. The message M (having any format, and preferably having an interoperable format such as, e.g., JSON) to be transmitted from the hardware interface 11 to the blockchain (the message M comprising for instance the data of a RFID reading concerning a warehouse transaction, or the data concerning any other event of interest) and it is first encrypted together with the Dongle Unique Identifier $UID_H$ using the key K, and then sent 101 to the dongle 10.

Figure 4:
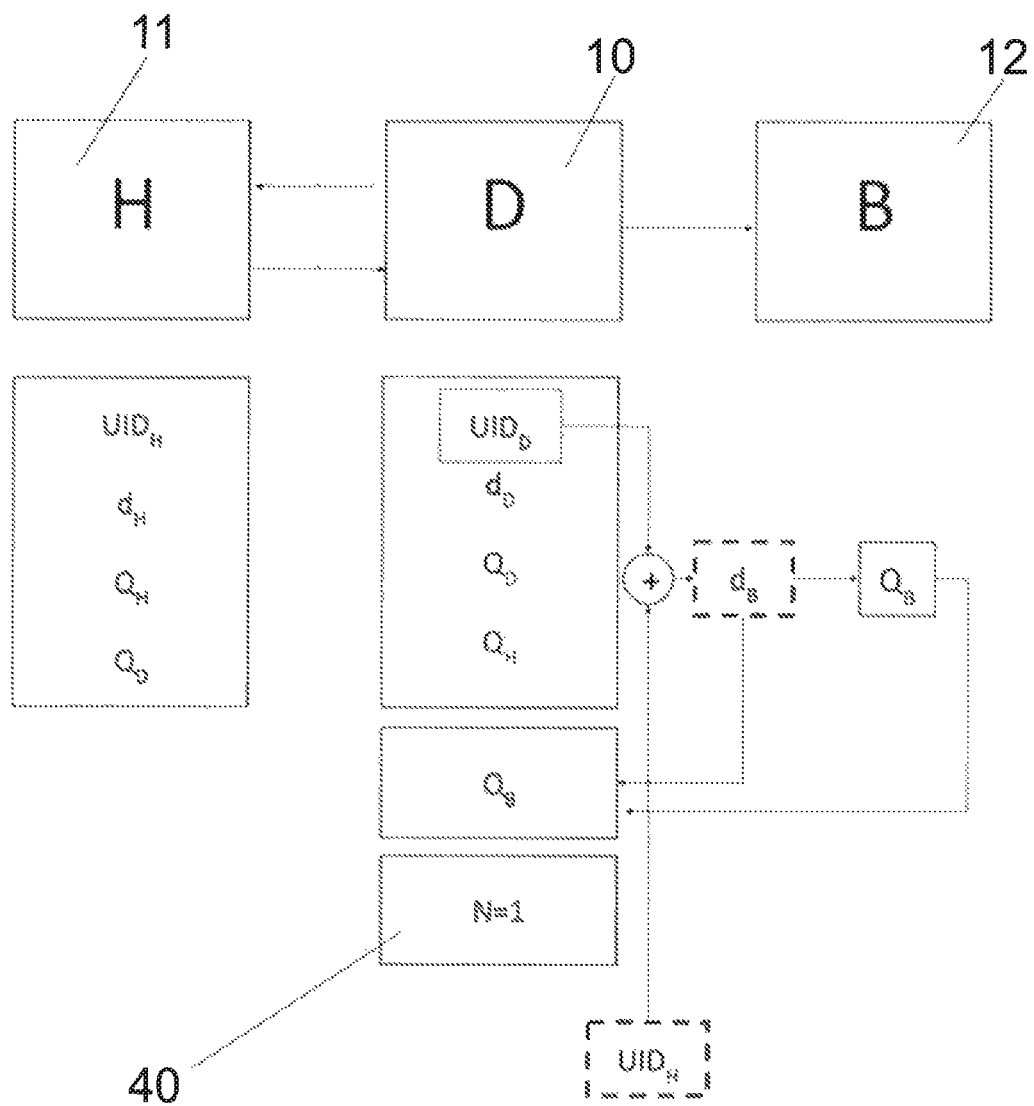
FIG. 4 shows a schematic block diagram of a preferred embodiment of the system according to the present disclosure wherein a hardware monotonous counter is employed within the device of the invention to provide additional security.

Timestamped messages or cryptographic nonce can be used to avoid replay attacks. With reference to FIG. 4, in a particular instance of the Dongle 10, a hardware monotonous counter N 40 can be used to always ensure that old messages are not resent by an attacker or by a malfunctioning hardware interface 11 over the channel. Additional security steps can be taken by periodically generating a different secret key K to encrypt the communication over the insecure channel.

Still with reference to FIG. 4, when a message is received, the dongle will reconstruct the blockchain private key $d_B$ by applying the following algorithm to the received message:

By means of some Password Based Key Derivation Function (i.e PBKDF2) applied to some juxtaposition of at least $UID_H$ and $UID_D$ (but $d_D$ can also be used in this process), the initial entropy S for the deterministic calculation of $d_B$ is generated;

Once $d_B$ is generated, it is used to sign blockchain transactions in the Dongle. The first time $d_B$ is generated, the corresponding blockchain public address $Q_B$ is derived and stored in Secure Storage.

Then $d_B$ is immediately cancelled from the Dongle memory. Any subsequent generation of $d_B$ will additionally check that the corresponding $Q_B$ is the same as the one stored in the Secure Storage.

Figure 5:
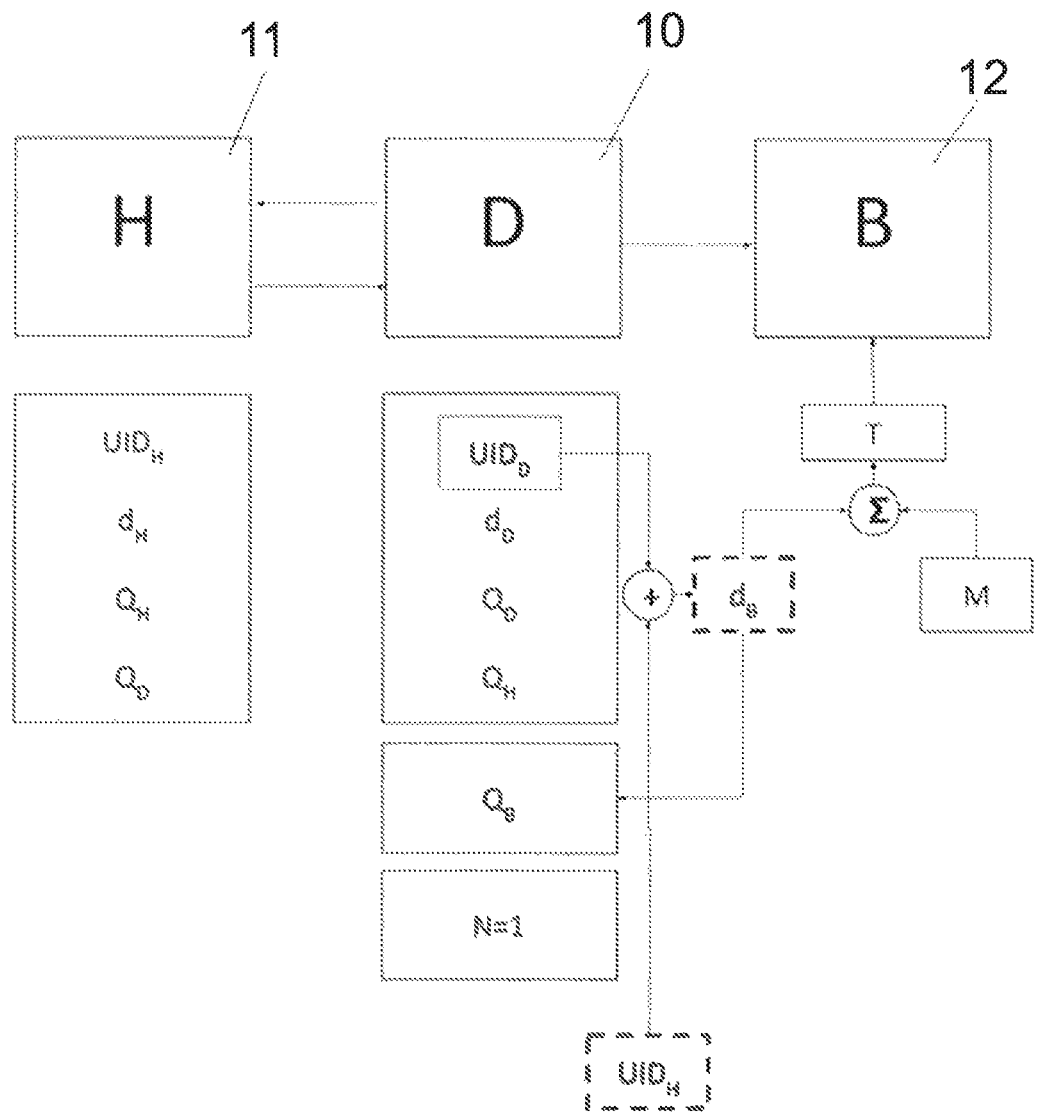
FIG. 5 shows a schematic block diagram of a preferred embodiment of the system according to the present disclosure wherein a first transaction between the device of the invention and a connected hardware Interface, and the generation of the blockchain private key is illustrated.

With reference to FIG. 5, once the message M is converted to the blockchain format, a transaction can be generated. Once the transaction is successfully signed with dB, it can be directly sent to the blockchain by the dongle 10 or can be transmitted back to the hardware interface 11 that will send it to the blockchain in case the dongle is not provided with connectivity.

Figure 6:
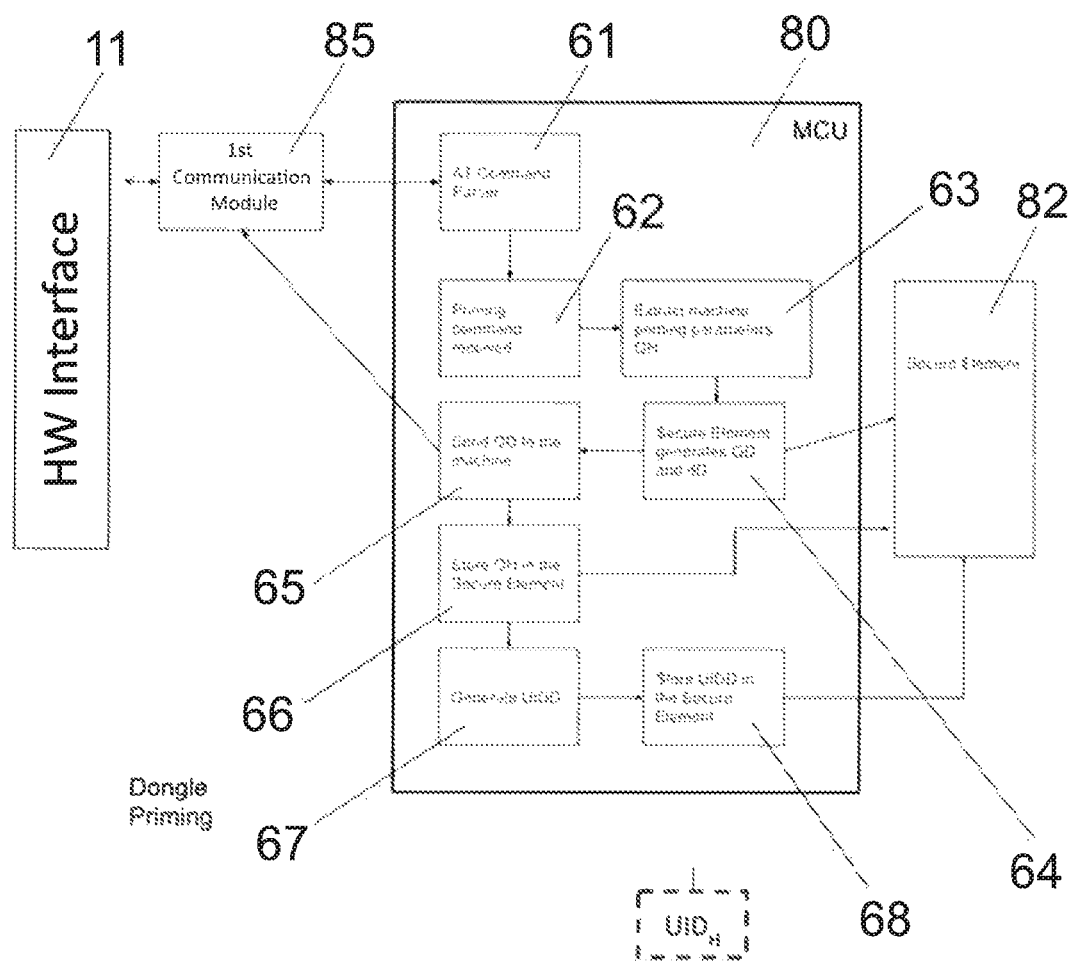
FIG. 6 shows a schematic block diagram of a preferred embodiment of the priming process within the device of the invention.

With reference to FIG. 6 and FIG. 9, in further detail the priming process within the dongle 10 is carried out as follows. The hardware interface 11 prompts the dongle 10 sending a priming command e.g. an AT priming command— over a non-encrypted channel and through the first communication module 85. The dongle 10 has an empty secure element 82. The dongle 10 interpret the command for instance with an AT command parser—61, the command is recognized 62 and analyzed to extract 63 the public key $Q_H$ of the hardware interface 11. Then the dongle 10 (e.g. the secure element 82 of the dongle 10) generates 64 a private/public key pair $Q_D/d_D$ in a way that $d_D$ never needs to leave the secure element 82; then the key $Q_D$ is sent back 65 to the hardware interface 11 and the key $Q_H$ is sent 66 to the secure element 82 to be stored. At this point the random string $UID_D$ is generated 67 by the device 10 and sent 68 to the secure element 82 to be stored. Thus at the end of the priming process the secure element 82 now stores the parameters $UID_D$, $Q_D$, $Q_H$ and $d_D$.

Figure 7:
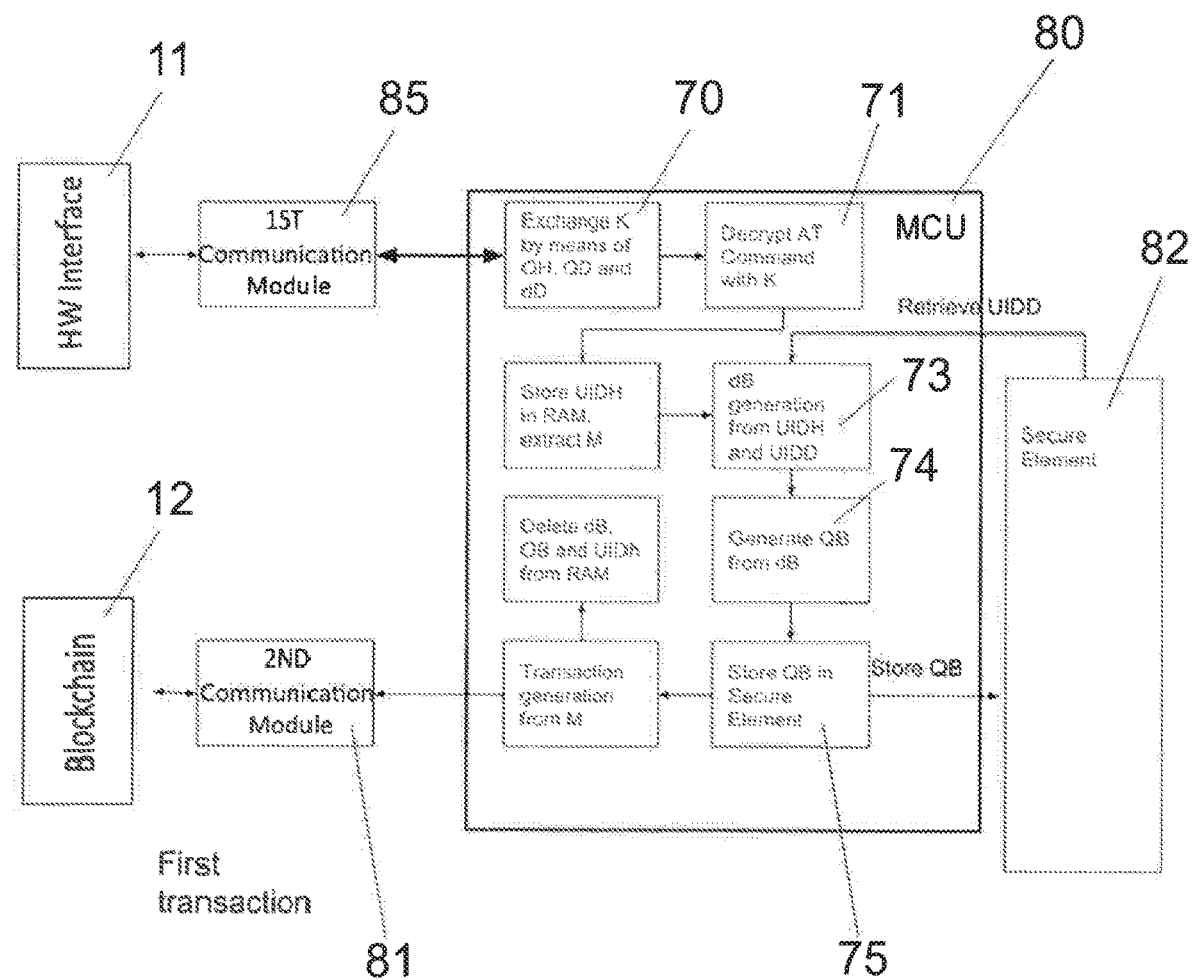
FIG. 7 shows a schematic block diagram of a preferred embodiment of a first transaction within the device of the invention.

After the priming initialization phase, and with reference to enclosed FIG. 7 and FIG. 10, the first transaction is carried out as follows:

The hardware interface 11 starts by sending a blockchain command to the dongle 10 wherein the secure element 82 contains $UID_D$, $Q_D$, $Q_H$ and $d_D$ but not the dongle blockchain address, $Q_B$, yet. The hardware interface 11 and the dongle 10 cooperate in securely exchanging 70 a secret key K over an insecure channel by applying, for instance, the Diffie-Hellman key exchange algorithm (in one of its flavors DH, DHE, ECDH, ECDHE). The Diffie-Hellman algorithm requires 5 parameters: two pairs of private-public keys and the characteristics of domain over which the calculations are performed (generally elliptic curves or integer multiplicative groups). The keys $d_D$, $Q_D$, $d_H$ and $Q_H$ are used in this step as parameters of the Diffie-Hellman algorithm ($d_D$ and $d_H$ being the private keys, $Q_D$ and $Q_H$ the public keys; the domain is determined by the Diffie-Hellman flavor chosen) with $d_D$ and $d_H$ never leaving the secure storage 82; the secret key K is then used to decrypt 71 the AT command previously received, the hardware interface 11 Unique Identifier, $UID_H$, is extracted 72 from the AT command together with the message M and $UID_H$ is stored in the RAM of the microcontroller of the dongle 10. The $UID_D$ is then read from the secure storage 82 and from $UID_D$ and $UID_H$ (and, optionally, further additional information), $d_B$ is generated 73 and stored in the RAM of the microcontroller of the dongle 10. The blockchain address $Q_B$ is derived 74 from $d_B$ and then $Q_B$ is sent 75 to the secure element 82 to be stored therein. Finally, the blockchain transaction is generated 76 and sent to the blockchain. $UID_H$, $d_B$, $UID_D$ and $Q_B$ are deleted from the RAM of the microcontroller of the dongle 10.

Figure 11:
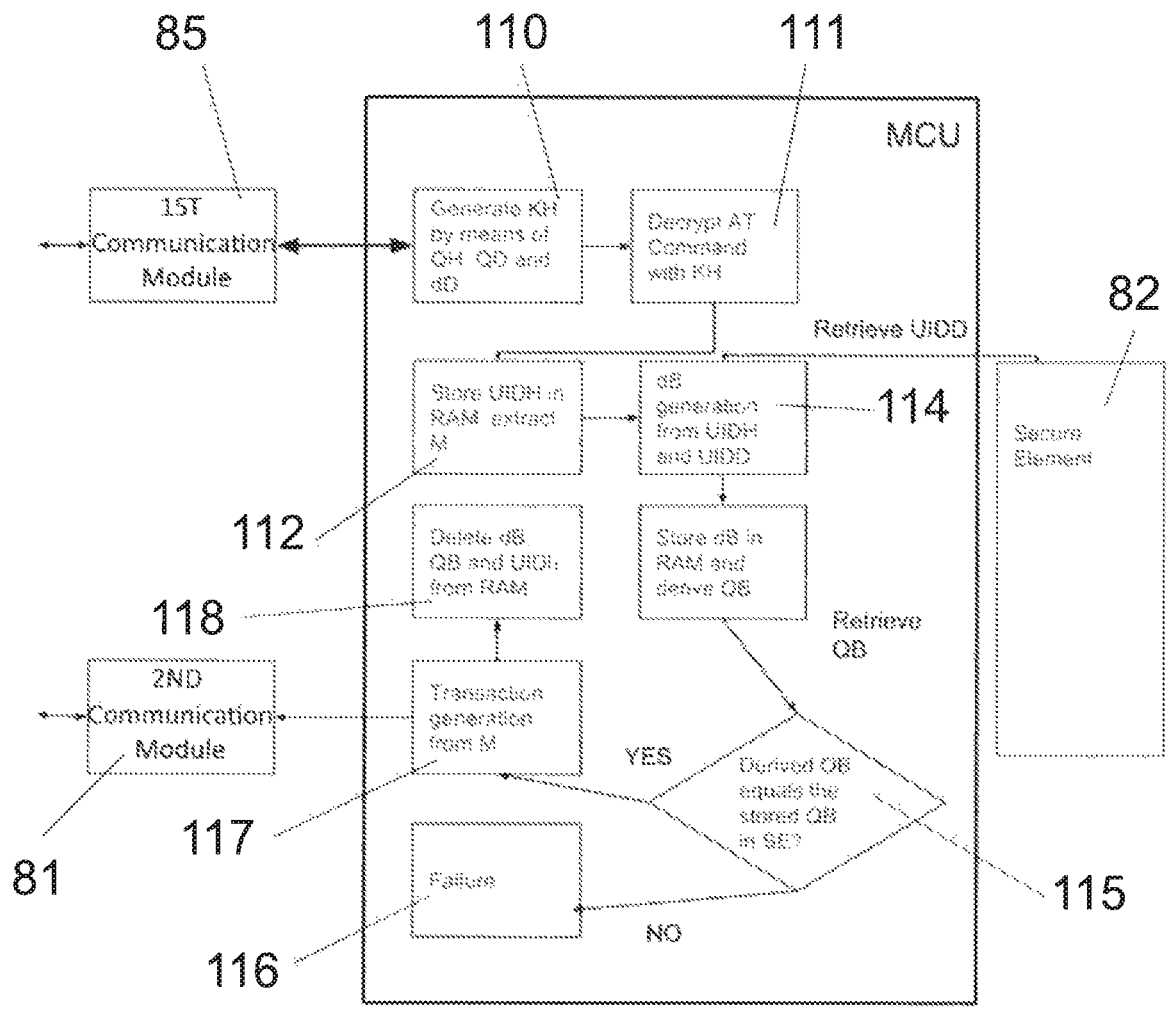
FIG. 11 shows a schematic block diagram of a preferred embodiment of a $n^{th}$ transaction, when n>1, within the device of the invention.
Figure 13:
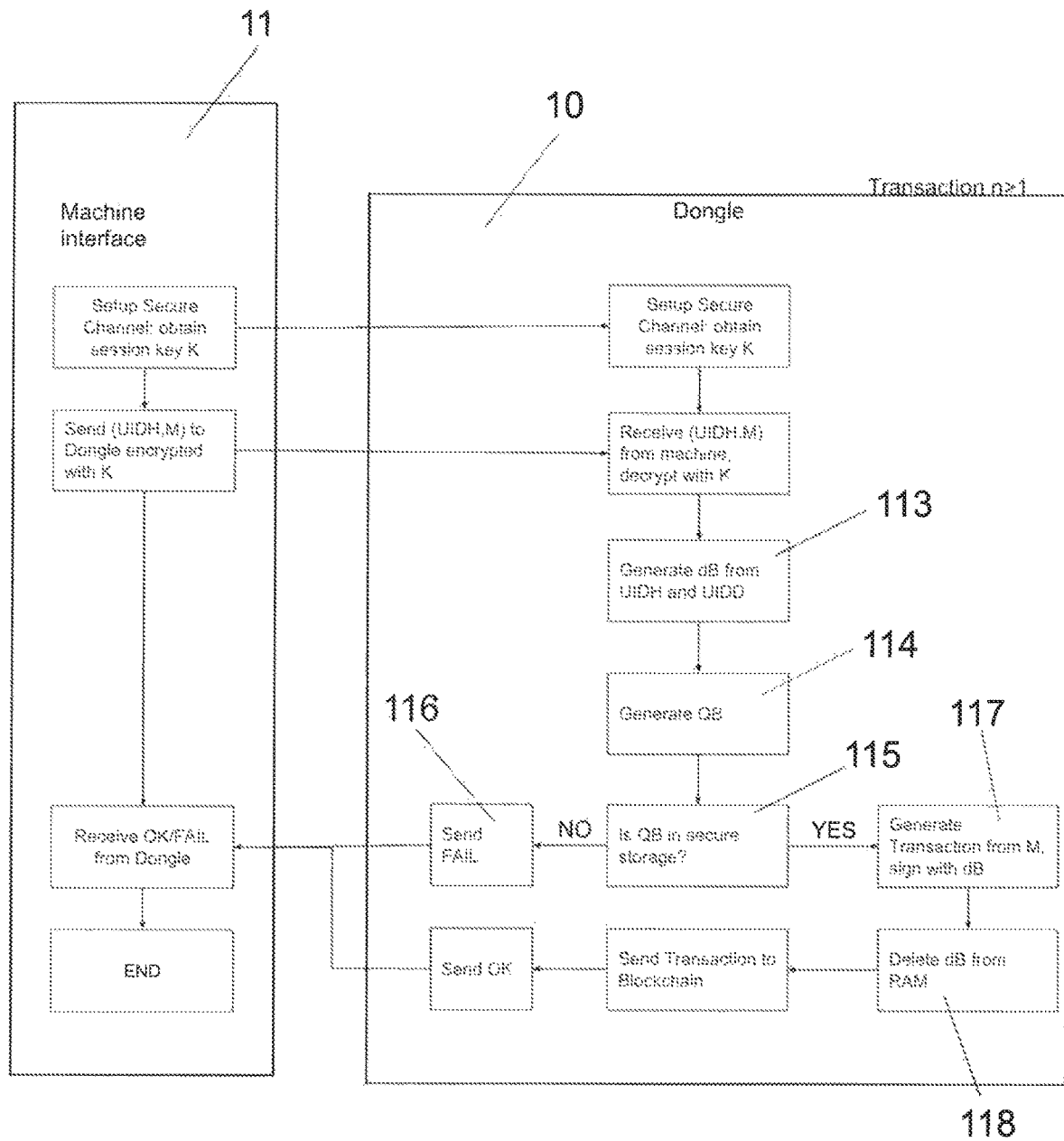
FIG. 13 shows an additional schematic block diagram of a preferred embodiment of a $n^{th}$ transaction, when n>1, within the system of the invention with the steps performed by the device of the invention and by the hardware interface highlighted.

With reference to FIG. 11 an FIG. 13 the $n^{th}$ transaction (n>1) begins with the hardware interface 11 sending a blockchain AT command to the dongle 10 with a primed secure element that contains the dongle blockchain address $Q_B$. The hardware interface (11) and the device (10) cooperate in securely generating and exchanging (70) a secret key K, said secret key K being generated from the keys dD, QD, dH and QH, e.g. executing a Diffie-Hellman algorithm. The secret key K is used to decrypt 111 the AT command; then $UID_H$ is extracted from the AT command together with the message M and $UID_H$ is stored 112 in the RAM of the microcontroller of the dongle 10; $UID_D$ is then read from the secure storage 82 and from $UID_D$ and $UID_H$ (and, optionally, further additional information), $d_B$ is generated 113 and stored in the RAM of the microcontroller of the dongle 10.

The blockchain address $Q_B$ is derived 114 from $d_B$, and then $Q_B$ is checked against the $Q_B$ contained in the secure element 82: if they differ, the transaction is not generated and the command fails 116, otherwise a blockchain transaction is generated 117 from M and dB and finally $UID_H$, $d_B$, $UID_D$ and $Q_B$ are deleted from the RAM of the microcontroller of the dongle 10.

Figure 12:
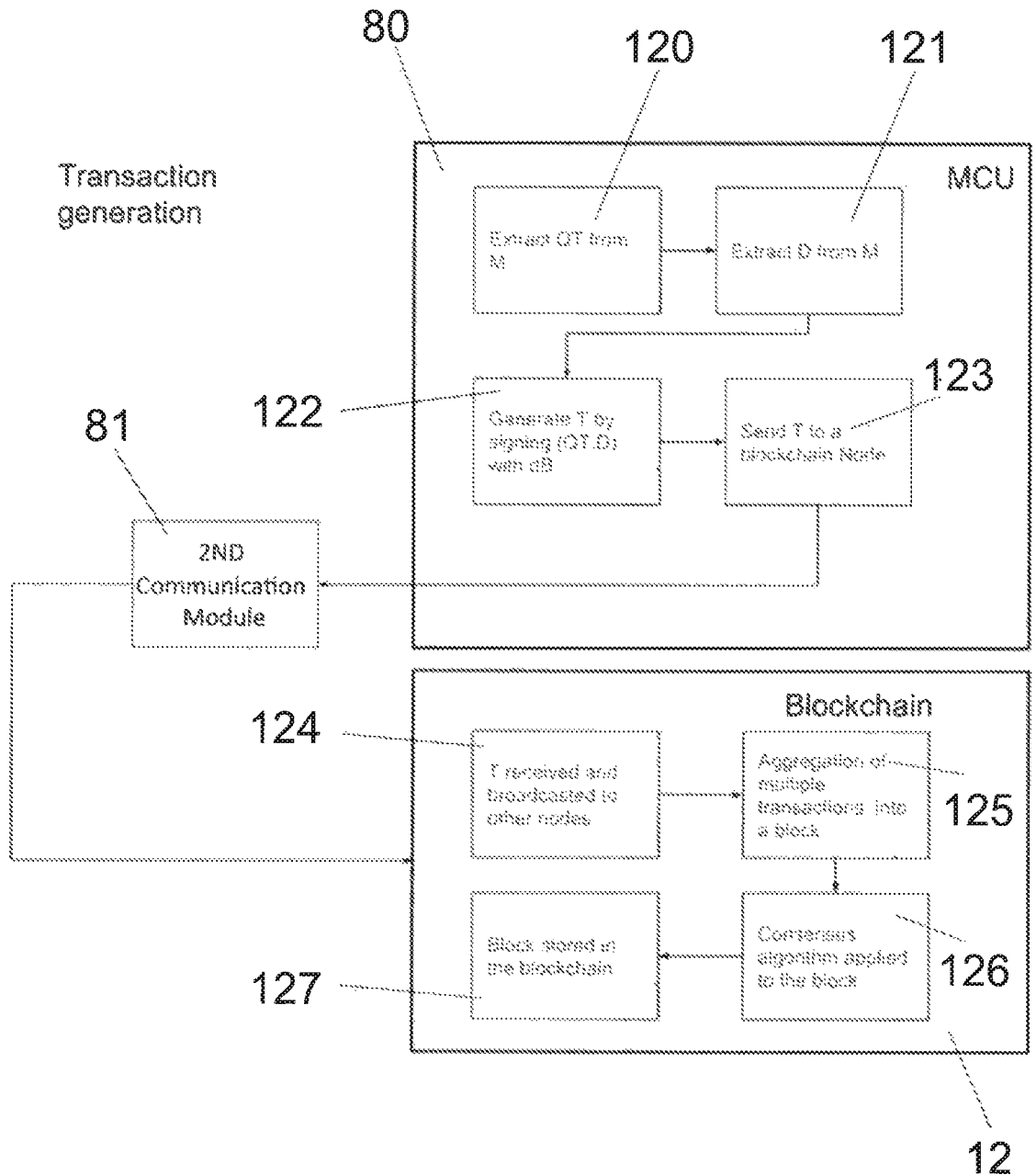
FIG. 12 shows a schematic block diagram of a preferred embodiment of blockchain transaction process between the device of the invention and a blockchain node.

In further detail and with reference to FIG. 12, the step of generating 117 a blockchain transaction can be carried out as follows:

The address QT of the blockchain receiving the transaction is extracted 120 from the message M; additional data D to be embedded in the blockchain transaction is then extracted 121 from the message M. A blockchain transaction T is then generated 122 by signing the tuple (QT,D) with $d_B$; at this point T is sent 123 to a blockchain node for validation and storage. The communication channel to the blockchain is not necessarily encrypted. T is then received 124 by a blockchain node and it is broadcasted to all adjacent nodes; the blockchain node aggregates 125 T with other received transactions to form a block; said block is modified 126 accordingly to the particular blockchain to pass the consensus algorithm of the blockchain (for example by embedding a proof of work) and finally the block is stored 127 in the blockchain with the transaction T written inside.

A possible variant of the described algorithm for the reconstruction of $d_B$ (multi-agent variant) allows the reconstruction of $d_B$ only by the interaction of the dongle 10 with multiple hardware interfaces 11 each one carrying a different $UID_H$ and $d_H$. In such case, with reference to FIG. 4, S is generated from the juxtaposition of $UID_{H1}$, $UID_{H2}$, ... $UID_{Hn}$ and $UID_D$, therefore allowing signing a transaction only after the successful interaction of all hardware interface 11.

Another possible variant of the described algorithm for the reconstruction of dB (multi-agent thresholded variant) allows the reconstruction of $d_B$ only when a subset of at least m hardware interfaces 11 of the total n hardware interface 11 send a message to the dongle. The process is akin to a voting system where a blockchain transaction is generated only if the majority (defined by the threshold m; the higher m, the higher the level of consensus between the HWUnits required by the dongle to create a transaction) of HWUnits agree on its content. In this variant the $UID_{H1}$, $UID_{H2}$, ... $UID_{Hn}$ are not random strings but they are string pre-generated and assigned to hardware interface 11 by means of a sharing secrete scheme (i.e. Shamir Secret Sharing Scheme). In sharing secret schemes, a secret P (generally a random string) is converted to n different strings; these strings share a useful property: if at least m of the n strings are known by an agent, it is possible for the agent to reconstruct the original secret P. In the multi-agent thresholded variant, a secret P is randomly generated and used as input for a sharing secret scheme. P is therefore transformed into $UID_{H1}$, $UID_{H2}$, ... and the secret P can be reconstructed in the dongle 10 as soon as the dongle 10 receives m different $UID_{H1}$. Still with reference to FIG. 4, the secret P is used to generate the string S by juxtaposition of P with $UID_D$. In the multi-agent thresholded variant, knowing all the $UID_{Hi}$ is not enough to reconstruct $d_B$ since $UID_D$ is missing.

The invention claimed is:

1. A data communication system for transferring data from a hardware unit to a blockchain or other distributed ledger, comprising:
a hardware interface to connect to the hardware unit;
a device in turn comprising:
a microcontroller,
a secure element connected to the microcontroller,
first communication module,
a communication protocol for enabling the microcontroller to communicate with the hardware interface through the first communication module, and
wherein the microcontroller is operable to: read data from the hardware unit through the hardware interface; generate a transaction corresponding to the data; securely generate a blockchain private key $d_B$; digitally sign the transaction by means of using the blockchain private key $d_B$; deliver the digitally signed transaction, and then delete the blockchain private key $d_B$ from volatile memory of the hardware unit, wherein the microcontroller is adapted to generate the blockchain private key $d_B$ from parameters contained in part from the device itself and in part from the hardware interface.

2. The data communication system according to claim 1 further comprising a second communication module for connecting to a remote server where a blockchain or a generic distributed ledger node is hosted, and for directly delivering the digitally signed transaction into the blockchain or into the generic distributed ledger node.

3. The data communication system according to claim 1, wherein the communication protocol for enabling the microcontroller to communicate with at least a hardware unit is based on a Hayes command set.

4. The data communication system according to claim 1, wherein the secure element comprises a hardware cryptographic engine.

5. The data communication system according to claim 1, wherein the hardware interface comprises a computational unit, a communication channel adapted to connect to the device to exchange data and memory for storing the data.

6. The data communication system according to claim 5, wherein the memory is a secure memory.

7. A method for transferring data from a hardware unit to a blockchain or other distributed ledger with the data communication system according to claim 1, wherein an initial priming phase is performed comprising the following steps:
the hardware interface generates and stores a Unique Identifier string $UID_H$, a Private Key $d_H$, and a Public Key $Q_H$;
the hardware interface prompts the device by sending a priming command and the Public Key $Q_H$ through the first communication module;
the device extracts the public key $Q_H$ of the hardware interface;
the device generates a Private Key $d_D$ and a Public Key $Q_D$ and stores the Private Key $d_D$ and the Public Key $Q_D$ in the secure element;
the device sends the Public Key $Q_D$ to the hardware interface and stores the Public key $Q_H$ in the secure element; and
the device generates a Unique Identifier string $UID_D$ and stores the Unique Identifier string $UID_D$ in the secure element.

8. The method according to claim 7, wherein a first transaction phase is performed comprising the following steps:
the hardware interface sends a command to initiate a blockchain transaction to the device with the primed secure element that does not contain a dongle blockchain address $Q_B$;

the hardware interface and the device cooperate in securely generating and exchanging a secret key K, said secret key K being generated from the private and public keys $d_D$, $Q_D$, $d_H$ and $Q_H$ of the device and hardware interface;

the device decrypts the command received using the secret key K and extracts the hardware interface Unique Identifier $UID_H$ and a message, M, to be sent to the blockchain;

the device reads the Unique Identifier string $UID_D$ from the secure element and generates from $UID_D$ and $UID_H$ the blockchain private key $d_B$;

the device derives the dongle blockchain address $Q_B$ from the blockchain private key $d_B$ and then the dongle blockchain address $Q_B$ is stored into the secure element;

the device generates the blockchain transaction and sends it to the blockchain; and the device deletes $UID_H$, $d_B$, $UID_D$ and $Q_B$.

9. The method according to claim 7, wherein an $n^{th}$ transaction phase, when n>1, is performed comprising the following steps:

the hardware interface sends a blockchain AT command to the device with a primed secure element that contains a dongle blockchain address $Q_B$;

the hardware interface and the device cooperate in securely generating and exchanging a secret key K, said secret key K being generated from the private and public keys $d_D$, $Q_D$, $d_H$ and $Q_H$ of the device and hardware interface;

the device decrypts the command received using the secret key K and extracts the hardware interface Unique Identifier $UID_H$ and a message M to be sent to the blockchain;

the device reads the Unique Identifier string $UID_D$ from the secure element and generates, from $UID_D$ and $UID_H$, the blockchain private key $d_B$;

the device derives the blockchain address $Q_B$ from $d_B$;

the device compares the blockchain address $Q_B$ as calculated at the previous step, with the blockchain address $Q_B$ stored in the secure element;

if the blockchain addresses compared at the previous step differ, the transaction is not generated, if the blockchain addresses compared at the previous step match, then the device generates a blockchain transaction from the message M and the blockchain private key $d_B$; and the device deletes $UID_H$, $d_B$, $UID_D$ and $Q_B$.

10. The method according to claim 8, wherein the step of generating a blockchain transaction is carried out as follows:

the device extracts from the message M, an address QT of the blockchain receiving the transaction;

the device extracts from the message M additional data D to be embedded in the blockchain transaction; and the device generates a blockchain transaction T by signing a tuple (QT,D) with $d_B$.

11. The method according to claim 8, wherein the step of generation of the blockchain private key $d_B$ is carried out by interaction of the device with multiple hardware interfaces each one carrying a different $UID_H$ and $d_H$.

12. The method according to claim 8, wherein the step of generation of the blockchain private key $d_B$ is carried out only when a subset of at least m hardware interfaces of a total n hardware interface interacts with the device.

13. A device for transferring data from a hardware unit to a blockchain or other distributed ledger, comprising:

a microcontroller, a secure element connected to the microcontroller, a first communication module, and a communication protocol for enabling the microcontroller to communicate with an external hardware interface through the first communication module, wherein the microcontroller is adapted to: read data from the hardware unit through the hardware interface; generate a transaction corresponding to the data; securely generate a blockchain private key $d_B$; digitally sign the transaction by the blockchain private key $d_B$; deliver the signed transaction, and then delete the blockchain private key $d_B$ from volatile memory of the hardware unit.

14. The device according to claim 13, wherein the microcontroller is adapted to generate a blockchain private key $d_B$ from parameters contained part in the device itself and part in the hardware interface.

15. The device according to claim 13 further comprising a second communication module for connecting to a remote server where a blockchain or a generic distributed ledger node is hosted and for directly delivering the signed transaction into the blockchain or into the generic distributed ledger.

16. The device according to claim 13, in which the device is manufactured in a form of a dongle.

17. The device according to claim 14 further comprising a second communication module for connecting to a remote server where a blockchain or a generic distributed ledger node is hosted and for directly delivering the signed transaction into the blockchain or into the generic distributed ledger.

18. The device according to claim 14, in which the device is manufactured in a form of a dongle.

19. The device according to claim 15, in which the device is manufactured in a form of a dongle.

* * * * *